(12) United States Patent
Soh et al.

(10) Patent No.: US 7,991,022 B1
(45) Date of Patent: Aug. 2, 2011

(54) OPTICAL PULSE AMPLIFICATION BASED ON STIMULATED RAMAN SCATTERING

(75) Inventors: Daniel Beom Soo Soh, Sunnyvale, CA (US); Anthony Hong Lin, Palo Alto, CA (US)

(73) Assignee: Calmar Optcom, Inc., Sunnyvale, CA (US)

( * ) Notice: Subject to any disclaimer, the term of this patent is extended or adjusted under 35 U.S.C. 154(b) by 0 days.

(21) Appl. No.: 12/352,843

(22) Filed: Jan. 13, 2009

Related U.S. Application Data

(60) Provisional application No. 61/011,278, filed on Jan. 16, 2008.

(51) Int. Cl.
*H01S 3/30* (2006.01)

(52) U.S. Cl. .................... 372/3; 372/6; 372/21

(58) Field of Classification Search .......... 372/3, 6, 372/21
See application file for complete search history.

(56) References Cited

U.S. PATENT DOCUMENTS

| | | | |
|---|---|---|---|
| 4,794,598 A * | 12/1988 | Desurvire et al. ........... 372/3 |
| 4,846,561 A | 7/1989 | Soileau et al. |
| 5,832,006 A * | 11/1998 | Rice et al. ................. 372/3 |
| 5,917,179 A * | 6/1999 | Yao ..................... 250/227.11 |
| 6,097,741 A | 8/2000 | Lin et al. |
| 6,252,892 B1 | 6/2001 | Jiang et al. |
| 6,373,867 B1 | 4/2002 | Lin et al. |
| 6,546,169 B1 | 4/2003 | Lin et al. |
| 6,567,438 B2 | 5/2003 | Lin |
| 6,570,892 B1 | 5/2003 | Lin et al. |
| 6,590,910 B2 | 7/2003 | Lin |
| 6,643,299 B1 | 11/2003 | Lin |
| 6,703,582 B2 * | 3/2004 | Smart et al. ............. 219/121.62 |
| 6,741,619 B1 | 5/2004 | Thoen et al. |
| 6,816,652 B1 | 11/2004 | Lin et al. |
| 6,839,363 B2 | 1/2005 | Lin et al. |
| 6,845,108 B1 | 1/2005 | Liu et al. |
| 7,031,619 B2 * | 4/2006 | DeCusatis et al. ........... 398/196 |
| 7,573,918 B1 | 8/2009 | Soh et al. |
| 7,602,825 B1 | 10/2009 | Lin et al. |
| 2002/0071453 A1 | 6/2002 | Lin |
| 2002/0071454 A1 | 6/2002 | Lin |
| 2002/0172486 A1 * | 11/2002 | Fermann ..................... 385/128 |
| 2002/0176452 A1 | 11/2002 | Lin et al. |
| 2003/0169784 A1 | 9/2003 | Sutter et al. |
| 2004/0263950 A1 * | 12/2004 | Fermann et al. ............. 359/333 |
| 2005/0105865 A1 * | 5/2005 | Fermann et al. ............. 385/122 |
| 2005/0190802 A1 * | 9/2005 | Richardson et al. ........... 372/25 |
| 2005/0238070 A1 * | 10/2005 | Imeshev et al. ............... 372/21 |

OTHER PUBLICATIONS

Corless, R.M., et al., "On the Lambert W function", Advances in Computational Mathematics vol. 5, (1996) pp. 329-359.

Fermann, M.E., "Self-similar propagation and amplification of parabolic pulses in optical fibers"; Physical Review Letters, vol. 84, No. 26, Jun. 26, 2000, pp. 6010-6013.

Kuckartz, M., et al., "Theoretical and experimental studies of combined self-phase modulation and stimulated Raman-scattering in single-mode fibres", Optical and Quantum Electrics, vol. 19, 1987, pp. 237-246.

Shah, Lawrence, et al., "High energy femtosecond Yb cubicon fiber amplifier", Optics Express, vol. 13, No. 12, Jun. 13, 2005, pp. 4717-4722.

(Continued)

*Primary Examiner* — Minsun Harvey
*Assistant Examiner* — Michael Carter

(57) ABSTRACT

Techniques and apparatus for using stimulated Raman scattering in an optical gain medium to produce amplified laser pulses.

36 Claims, 12 Drawing Sheets

OTHER PUBLICATIONS

Soh, Daniel B., et al., "Efficient femtosecond pulse generation using a parabolic amplifier combined with a pulse compressor. I. Stimulated Raman-scattering effects"; J. Opt. Soc. Am B, vol. 23, No. 1, Jan. 2006, pp. 1-9.

Stolen, R.H., et al., "Raman responses function of silica-core fibers", J. Opt. Soc. Am. B., vol. 6, No. 6, Jun. 1989, pp. 1159-1166.

Strickland, D., et al., "Compression of amplified chirped optical pulses"; Optics Communications, vol. 5, Oct. 15, 1985, pp. 447-449.

* cited by examiner

OPTICAL PULSE AMPLIFICATION BASED ON STIMULATED RAMAN SCATTERING

PRIORITY CLAIM

This document claims the benefits of U.S. Provisional Application No. 61/011,278 entitled "High energy ultrashort pulsed fiber laser system using parabolic Raman pulse amplification" and filed on Jan. 16, 2008 by Daniel Beom Soo Soh and Anthony Hong Lin. The entire disclosure of the Application No. 61/011,278 is incorporated by reference as part of the disclosure of this document.

BACKGROUND

This document relates to optical amplifiers and lasers.

Various optical amplifiers are designed to amplify light by providing an optical gain at the same wavelength of the light to be amplified so that the light, after transmitting through an optical gain medium of the optical amplifier, is amplified in its power or energy and the amplified light is at the same wavelength of the original light prior to the amplification. The optical gain of the optical amplifier can be obtained by pump light that optically excites the optical gain medium such as a Nd or Yb doped fiber amplifier, or by an electrically energized gain medium such as a semiconductor optical amplifier based on quantum wells and other gain mechanisms.

SUMMARY

This document discloses optical amplification techniques and optical amplifiers that use the stimulated Raman scattering effect in optically-pumped gain media to produce amplified optical pulses at an optical wavelength that is shifted from the optical wavelength of the original optical pulses to be amplified.

In one implementation, a method for using stimulated Raman scattering to produce amplified laser pulses in an optical amplifier device includes directing a train of input laser pulses at a first pulse repetition rate and at an input laser frequency into an optical amplifier that has an optical gain section to amplify the input laser pulses; setting pump light coupled into the optical gain section at a power level to optically excite the optical gain section above a stimulated Raman scattering threshold of the optical gain section to generate Raman pulses that are at a Raman optical frequency shifted from the input laser frequency by a Raman frequency detuning and are amplified in power by the optical gain section; and coupling the Raman pulses out of the optical gain section as amplified laser pulses after a length of propagation in the optical gain section before or at beginning of generation of secondary Raman pulses from the Raman pulses at an optical frequency shifted from the Raman optical frequency of the Raman pulses by the Raman frequency detuning.

In another implementation, an optical pulse amplifier device for using stimulated Raman scattering to produce amplified laser pulses includes an optical amplifier that comprises an optical gain section to amplify light and an input port to receive input laser pulses at a first pulse repetition rate and at an input laser frequency; an optical pump unit coupled to the optical gain section to couple pump light into the optical gain section and to set power of the pump light to optically excite the optical gain section above a stimulated Raman scattering threshold of the optical gain section to generate Raman pulses that are at a Raman optical frequency shifted from the input laser frequency by a Raman frequency detuning and are amplified in power by the optical gain section; and a mechanism that couples the Raman pulses out of the optical gain section as amplified laser pulses after a length of propagation in the optical gain section before or at beginning of generation of secondary Raman pulses from the Raman pulses at an optical frequency shifted from the Raman optical frequency of the Raman pulses by the Raman frequency detuning.

In yet another implementation, an optical pulse amplifier device for using stimulated Raman scattering to produce amplified laser pulses includes an input port to receive laser pulses at a laser frequency; and an optical fiber amplifier module that is connected to receive the laser pulses from the input port and comprises (1) an optical fiber gain section to amplify light and (2) an optical pump unit coupled to the optical fiber gain section to couple pump light into the optical fiber gain section and to set power of the pump light to optically excite the optical fiber gain section above a stimulated Raman scattering threshold of the optical fiber gain section to generate Raman pulses that are at a Raman optical frequency shifted from the input laser frequency by a Raman frequency detuning and are amplified in power by the optical fiber gain section. This device also includes a fiber connector coupled to an output terminal of the optical fiber gain section to couple the Raman pulses out of the optical fiber gain section as amplified laser pulses after a length of propagation in the optical fiber gain section before or at beginning of generation of secondary Raman pulses from the Raman pulses at an optical frequency shifted from the Raman optical frequency of the Raman pulses by the Raman frequency detuning; and an optical pulse compression device coupled to receive the Raman pulses from the fiber connector that couples the Raman pulses out of the optical fiber gain section to compress a temporal duration of the Raman pulses.

These and other implementations are described in detail in the drawings, the description and the claims.

DETAILED DESCRIPTION

Figure 1:
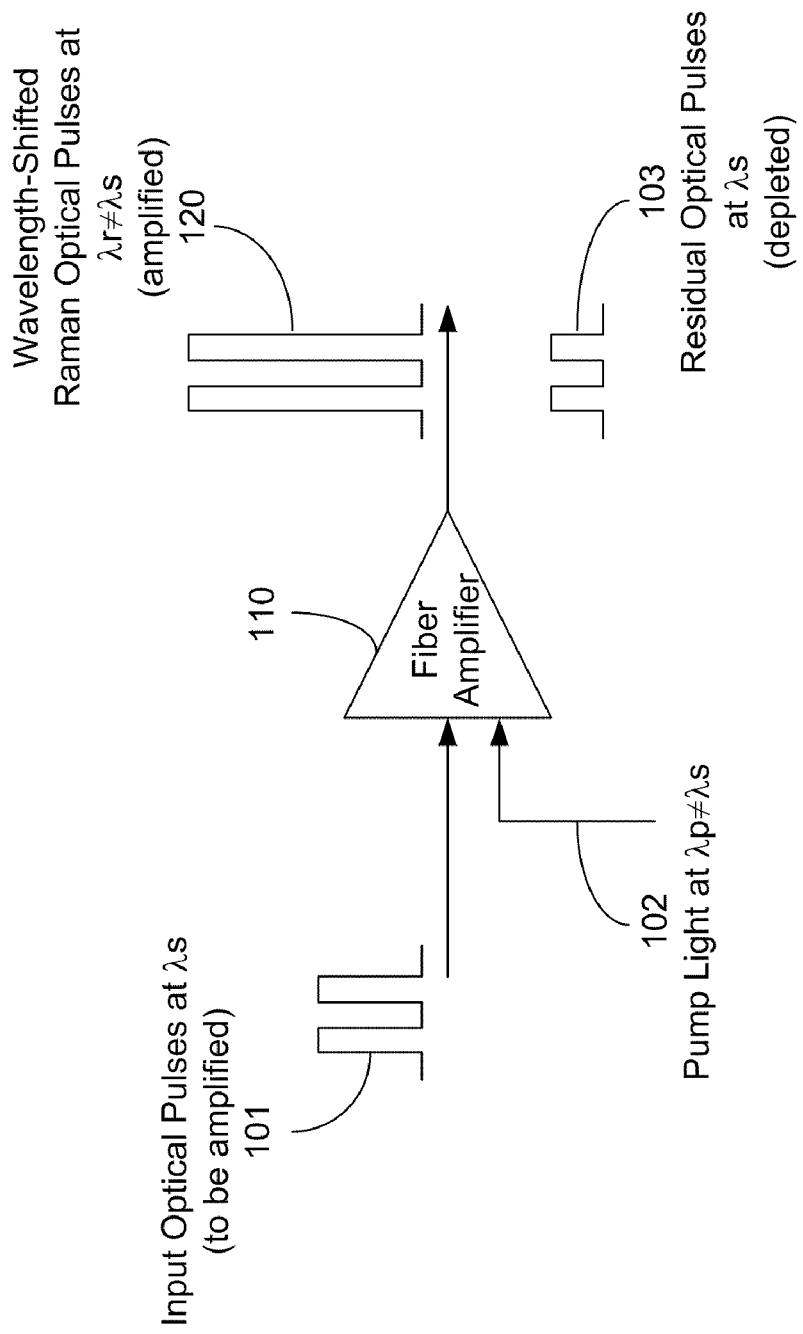
FIGS. 1 and 2 show two examples of pulse amplifier devices based on SRS.

Stimulated Raman Scattering (SRS) is a non-linear optical process in an optical medium due to the nonlinear optical Kerr effect when the intensity of light at an optical wavelength exceeds a SRS threshold. When SRS occurs, a Raman signal is generated in the same propagation direction of the original light by the non-linear SRS process in the medium at a Raman frequency that is shifted from the optical frequency of the original light by a Raman frequency detuning. The Raman frequency is usually lower than the frequency of the original light and can be higher than the frequency of the original light. In SRS, the original light acts as the pump light for generating the Raman signal and the energy of the original light is depleted and is transferred into the Raman signal via the SRS process. The SRS process in silica fiber, for example, has a Raman frequency detuning of 13.2 THz.

The SRS can lead to undesired effects in optical pulse amplification in fibers and other optical media exhibiting the nonlinear Kerr effect. For example, as the intensity of the optical pulses increases to reach the SRS threshold level, the optical power in the optical pulses is depleted and thus the SRS process puts an upper limit to the optical power of the optical pulses. In addition, optical nonlinear effects such as self-phase modulation can accumulate as the pulses propagate and make it difficult to obtain short pulses which are desirable in optical communications and other applications. Therefore, various optical pulse amplification techniques are developed to first stretch the optical pulses in the time domain to reduce the pulse peak power under the SRS threshold and to mitigate the accumulation of the optical nonlinear effects during the optical amplification process. After amplification of the stretched optical pulses, the amplified optical pulses are then compressed in time to produce desired short optical pulses.

In this regard, consider fiber lasers and amplifiers. Fiber lasers and amplifiers can have certain advantages over other laser and amplifier systems, such as compactness, maintenance-free operation, and cost-effectiveness. Due to the waveguiding nature, fibers can provide good beam quality in guided light without the need of complex optics for shaping the optical beam. The waveguiding nature of fibers, however, also renders it difficult to amplify short pulses with high peak power levels. Notably, small fiber cores in fibers lead to high optical intensity of the confined light and thus trigger optical nonlinear effects. Certain fiber amplifier systems are implemented based the chirped-pulsed amplification (CPA) to avoid or mitigate the undesired nonlinearity accumulation in fiber carrying optical pulses. In CAP, the optical pulse is first stretched in the time domain to reduce its peak power and the nonlinearity accumulation inside the high gain fiber amplifiers, and subsequently, amplified stretched pulses are compressed. In order to obtain higher energy output pulses, the stretching of the optical pulses is increased to increase the ratio between the stretched pulse duration and the compressed pulse duration. Such fiber systems may need to adopt free-space optics such as diffraction gratings to provide sufficient pulse stretching and pulse compression. However, adopting free-space optics may compromise the long-term reliability and the compactness of the fiber system. In addition, it is difficult to achieve very short pulses after the recompression, due to the higher-order dispersion that are not perfectly compensated, either by mismatching between the stretcher and compressor or the accumulation of higher order dispersion during the amplification.

The parabolic pulse amplification technique is an alternative to the CPA technique and uses the normal dispersion in optical fibers in combination with a positive gain in the fiber amplifier to produce a linearly chirped stretched optical pulse. In the parabolic pulse amplification, both the spectral and temporal pulse shape exponentially broadens along the fiber. The broadening factor depends on the input pulse energy and the gain in the amplifying fiber. The stretched parabolic pulse may be subsequently compressed through another fiber-type element, such as photonic crystal fibers. Thus, the combination of the parabolic pulse amplification technique along with the pulse-compression photonic crystal fiber can be used to achieve an all-fiber high energy short-pulse laser system. Such parabolic pulse amplification is limited in its amplifiable energies due to the stimulated Raman scattering effect and thus parabolic amplifiers tend to be designed to avoid stimulated Raman scattering.

The present optical amplification techniques and optical amplifiers provide wavelength-shifted pulse amplification based on the stimulated Raman scattering effect in optically-pumped gain media to produce amplified optical pulses at an optical wavelength that is shifted from the optical wavelength of the original optical pulses. The original optical pulses are amplified in an optical amplifier to have sufficient power to reach the SRS threshold so that the Raman optical pulses at the Raman optical frequency shifted from the frequency of the original optical pulses by the Raman frequency detuning are generated and amplified by depleting the original optical pulses via the SRS process. The Raman pulses are the amplified optical pulses that carry the information of the original optical pulses at a different optical frequency or wavelength. The Raman pulses are extracted out of the optical amplifying medium at a location along the propagation direction of the optical pulses before the SRS-generated Ramon pulses are significantly depleted due to generation of the secondary Raman pulses from the Ramon pulses at a secondary Raman frequency that is shifted in frequency from the optical frequency of the original optical pulses by twice the Raman frequency detuning. The light at the optical frequency of the original optical pulses and other light (e.g., the residual pump light of the optical amplifier, if any) can be filtered out so that the output of the amplifier is mainly the newly generated Raman pulses at the Raman frequency.

This SRS-based wavelength-shifted pulse amplification process is not a conventional amplification process in which optical energy or power is transferred into the light at the optical frequency of the original optical signal or pulses so that the optical signal or pulses at the original optical frequency are amplified. Instead, this SRS-based wavelength-shifted pulse amplification process uses the SRS process to generate new optical pulses at an optical frequency (i.e., the Raman frequency) different from the original optical frequency. The newly generated Raman pulses are much higher in power than the original optical pulses by obtaining optical power form the original optical pulses and from the pump light of the optical amplifier. As described in detail below, this SRS-based wavelength-shifted pulse amplification process can be implemented to have various technical advantages, such as high pulse energy, low amplified spontaneous emission level, good pulse quality and short pulse duration.

FIG. 1 illustrates an example of an SRS-based wavelength-shifted optical pulse amplifier device for using stimulated Raman scattering to produce amplified laser pulses. This device includes an input port to receive input optical pulses 101 at an input laser frequency $\lambda s$. An optical amplifier 110 is provided to receive and amplify the input optical pulses 101. The optical amplifier 110 includes an optical gain section under optical pumping to amplify light of the received optical pulses 101. Optical pump light 102 at an optical pump frequency $\lambda p$ is directed into the optical gain section of the amplifier 110 to pump the gain section to produce that optical gain which leads to amplification of the optical pulses 101 at $\lambda p$. This process transfers optical energy in the pump light 102 at the optical pump frequency $\lambda p$ into optical energy at the input laser frequency $\lambda s$. An optical pump unit is coupled to the optical gain section via an optical coupler such as a wavelength-selective optical coupler to couple the pump light 102 into the optical gain section. The optical pump unit is used to set the power of the pump light 102 to be sufficiently high to optically excite the optical gain section above a stimulated Raman scattering threshold of the optical gain section to generate Raman pulses 120 that are at a Raman optical frequency $\lambda r$ which is shifted from the input laser frequency $\lambda s$ by a Raman frequency detuning (e.g., 13.2 THz in silica). The Raman gain of the SRS process effectuates amplification of the generated Raman pulses when propagating through the optical gain section.

As the Raman pulses 120 grow in power in propagating through the optical gain section due to the amplification by the optical gain, the Raman pulses 120 can develop a sufficiently high peak power that triggers the SRS and thus generates secondary Raman pulses at an optical frequency shifted from the Raman optical frequency of the Raman pulses by the same Raman frequency detuning. This secondary SRS process would deplete the Raman pulses 120 and thus is undesirable. Accordingly, a mechanism is provided to couple the Raman pulses 120 out of the optical gain section as amplified laser pulses output of the device in FIG. 1 after a length of propagation of the Ramon pulses in the optical gain section before or at beginning of generation of secondary Raman pulses. This coupling mechanism can be an optical coupler placed in the optical path of the Raman pulses in the optical gain section and is placed at a selected location around which the Ramon pulse gain sufficient power at the SRS threshold. For example, the optical gain section can be a length of doped fiber (e.g., Nd or Yb) and the doped fiber can be terminated at the selected location after a length that is sufficient to amplify the Raman pulses near or at the SRS threshold. The terminated fiber facet can be part of the coupling mechanism.

Figure 2:
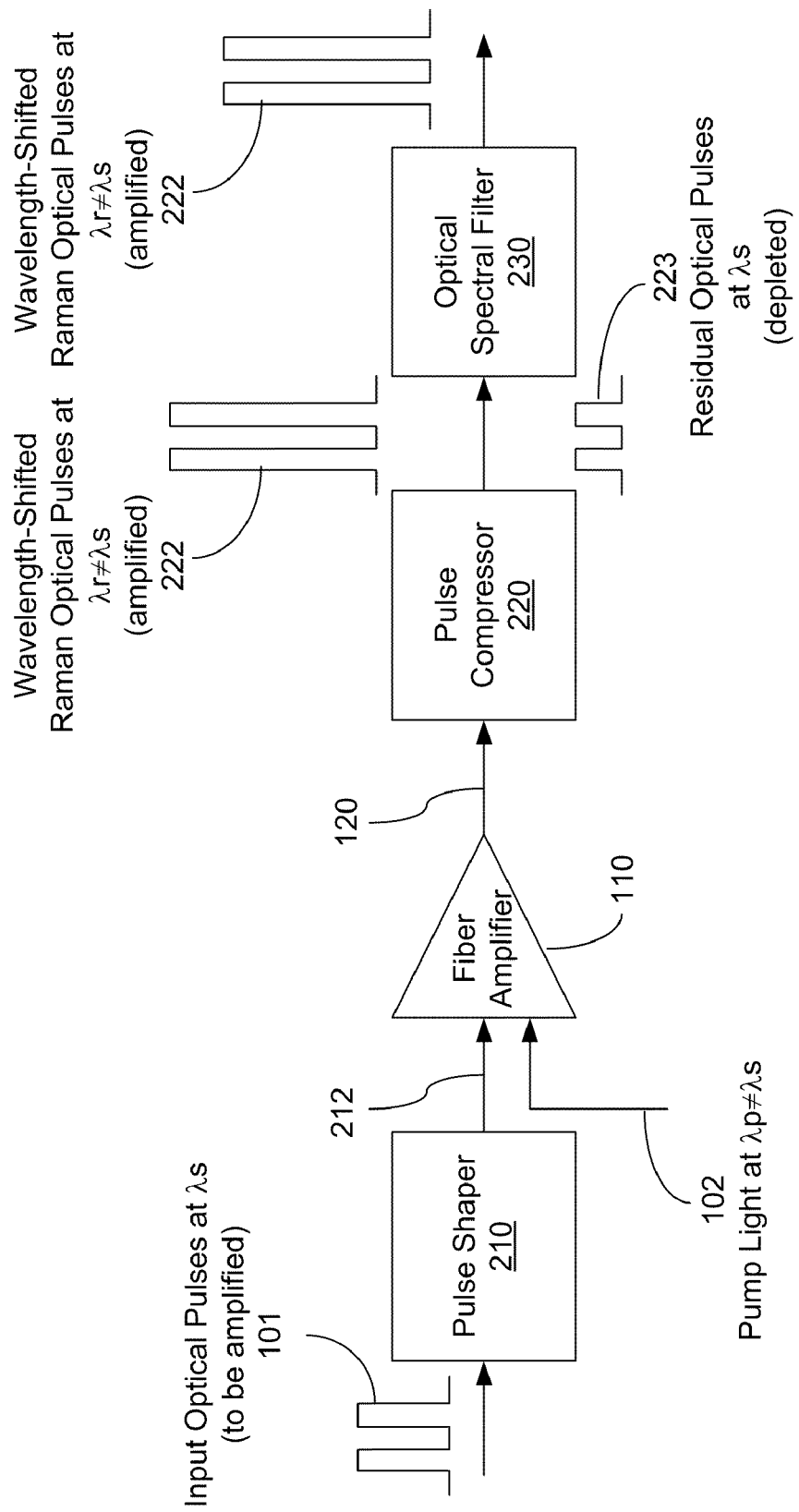

The pulse amplifier device in FIG. 1 can be implemented to include an optical pulse conditioning device upstream from the optical amplifier 110 to modify the received optical pulses at $\lambda s$ to facilitate the SRS process in the amplifier 110. For example, FIG. 2 shows an example of a pulse amplifier device that includes a pulse shaper 210 to modify the temporal profile of the input optical pulses 101 to produce modified pulses 212. The pulse shaper 210 can be implemented in various configurations, including a pulse stretcher, a parabolic pulse shaper, parabolic pulse amplifier, a cubicon generator, a pulse compressor, or any combination of these. The modified pulses 212 are then directed into the amplifier 110 to be amplified and to generate wavelength-shifted Raman pulses as part of the amplifier output 120. The modified pulses 212, after transmitting through the amplifier 110 and being depleted due to the SRS process, become the residual pulses 223. Under certain circumstances, a pulse downsampler, such as an acousto-optic modulator, may be provided to reduce the pulse repetition rate before the amplifier 110, thus facilitating increasing the individual pulse energy. Also, downstream from the amplifier 110, a pulse compression device 220 may be provided to compress the Raman pulses as the final output Raman pulses 222. The pulse compression device 220 can be implemented in various configurations, including a diffraction-grating pair, a prism pair, a grism pair with two prisms having transmission gratings, photonic crystal fiber, a volume Bragg grating, or any combination of these and other pulse compression devices.

As shown in FIG. 1, the output of the optical amplifier 110 can include both the wavelength-shifted Raman pulses 120 at the Raman wavelength $\lambda r$ and the residual optical pulses 103 at the input optical wavelength $\lambda s$. Depending on the design of the amplifier 110, some pump light at $\lambda p$ may also be present in the output of the amplifier 110. An optical spectral filter may be used to filter the light output from the amplifier 110 to transmit the light at Xr while rejecting light at other wavelengths including $\lambda s$ and $\lambda p$. FIG. 2 shows such a filter 230 located in the output of the pulse compression device 220 that transmits the wavelength-shifted Raman pulses 222 while rejecting light at other wavelengths. The filter 230 may be placed at a suitable location downstream from the amplifier 110, e.g., upstream to the pulse compression device 220. In some pulse compression device designs, the filter 230 may be integrated into the pulse compression device as shown in the example in FIG. 4 in which an aperture is used in an optical path of the light between two gratings or prisms to provide the spectral filtering via spatial filtering by blocking unwanted spectral components. The filter 230 can be implemented in various other configurations, including a dielectric coating filter.

The basic process for using stimulated Raman scattering to produce amplified laser pulses in an optical amplifier device such as in the device in FIG. 1 is to direct a train of input laser pulses at an input laser frequency into an optical amplifier that has an optical gain section to amplify the input laser pulses, and to set pump light coupled into the optical gain section to optically excite the optical gain section to amplify the optical pulses at $\lambda s$ above a stimulated Raman scattering threshold of the optical gain section to generate Raman pulses that are at a Raman optical frequency shifted from the input laser frequency by a Raman frequency detuning and are amplified in power by the optical gain section. The Raman pulses are then coupled out of the optical gain section as amplified laser pulses after a length of propagation in the optical gain section before or at beginning of generation of secondary Raman pulses from the Raman pulses at an optical frequency shifted from the Raman optical frequency of the Raman pulses by the Raman frequency detuning.

The optical gain section in the amplifier devices in FIGS. 1 and 2 may be made with various optical media that provide the desired optical gain under optical pumping by the pump light 102 and the nonlinear optical Kerr effect to support the SRS process. As a specific example, the following sections use silica fiber doped with rare-earth ions such as Nd or Yb to illustrate operations and various technical features of the devices in FIGS. 1 and 2. The doped fiber is normally dispersive and the optically pumped rare-earth doped ions in the fiber provide the optical gain to amplify the input optical pulses with a pulse energy level that reaches the SRS threshold in the doped fiber to create the wavelength-shifted Stokes light. The Stokes light forms a chirped pulse with a linear chirp so that, when recompressed, an ultrashort optical pulse may be obtained. In order to create the parabolic Raman pulses, the amplifying fiber and the input pulse should be designed, meeting a set of conditions. Recompressing the created parabolic Raman pulses produces high energy ultrashort pulses.

Consider a case where the input optical pulses 101 are parabolic pulses where the optical intensity of each pulse has a parabolic profile with respect to time. The parabolic pulses are amplified in the fiber amplifier to become high energy pulses that reach the stimulated Raman scattering threshold. Once the SRS threshold is met, the stimulated Raman scattering process generates a wavelength-shifted Raman parabolic pulse for each amplified parabolic pulse at the Raman frequency that is 13.2 THz downshifted from the optical frequency of the original parabolic pulse (i.e., Stokes pulse) in the silica-based optical fiber amplifier. Since the stimulated Raman scattering process is highly nonlinear, the energy extraction from the original parabolic pulse to the Stokes pulse at the Raman frequency happens relatively quickly. Once enough energy is extracted from the amplified original pulse, the Stokes pulse forms a parabolic pulse, is amplified again through the doped-fiber gain. In order to reduce energy depletion of the newly generated Stokes pulses by generation of the secondary Stokes pulse from each newly generated Stokes pulse, the fiber length of the amplifier is controlled so that the fiber terminates at or near the location where the power of the newly generated Stokes pulses reach the stimulated Raman scattering threshold, e.g., the length of the fiber amplifier may be set so that the SRS threshold for the newly generated Stokes pulses may happen near the end of the fiber amplifier. At this location, the newly generated Stokes pulses at or near the SRS threshold are coupled out as the amplified output pulses.

The amplifier devices in FIGS. 1 and 2 may be structured and operated to produce Raman pulses with a pulse energy level higher that that achieved in many CPA and parabolic pulse amplifier devices by a significant gap, e.g., one order of magnitude for the same stretched pulsewidth. In devices in FIGS. 1 and 2, the newly generated parabolic Raman pulse expands rapidly its spectral and temporal shape such that, during the amplification, the pulse peak power remains under the SRS threshold for triggering the second Stokes pulse.

The amplifier devices in FIGS. 1 and 2 can also be used to achieve one or more additional technical advantages in addition to the higher pulse energy level. For example, there is a negligible level of background amplified spontaneous emission (ASE) in the parabolic Raman pulses. This is in part because the parabolic Raman pulse amplification intrinsically has very little ASE at the Raman frequency since the stimulated Raman scattering process is proportional to the square of the original pulse power and, thus, ASE energy is not transferred to the Raman frequency. If the spectral components are well filtered, the parabolic Raman pulses are almost pure pulses with no background ASE. Various other high gain fiber laser and amplifier design tend to suffer from significant background ASE noise even when operated to saturate the amplifier to reduce the ASE power. The presence of the ASE reduces the available gain from the amplifier and may limit its use in some specific applications where only the pulses are needed without the ASE, such as laser-material ablation where the pulse ablates the material and any presence of ASE transfers the material heat and may cause catastrophic failure in the material under processing.

The amplifier devices in FIGS. 1 and 2 can also be used to achieve better pulse quality than other pulse amplification techniques such as various CPA and parabolic pulse amplifier devices. In the amplifier devices in FIGS. 1 and 2, the parabolic Raman pulse is created near the end of the amplifying fiber and as such the accumulation of the higher order dispersion in the pulse is minimized or suppressed. This suppressed high-order dispersion in the Raman pulses allows good pulse compressibility in compressing the Raman pulses. Tests on the amplifier device in FIG. 2 demonstrated that pedestal-free compressed ultrashort pulses can be achieved in Raman pulses. In comparison, amplified parabolic pulses at the same optical frequency as the original parabolic pulses tend to suffer from the excessive high order dispersion, due to the fact that such scheme needs relatively long amplifying fiber and the nonlinearity accumulation is proportional to the fiber length.

The amplifier devices in FIGS. 1 and 2 can also be used to generate compressed pulses shorter than pulses produced by other pulse amplification techniques such as various CPA and parabolic pulse amplifier devices. The parabolic pulse amplification broadens the optical spectrum of each pulse with a rate $\frac{1}{3}$ power proportional to the input energy. Therefore, the parabolic Raman pulse produced by the SRS process in the amplifier can a broader optical spectrum than the original pulse due to the higher pulse energy. Such spectrally broader Raman pulses render a shorter pulse width in time because the pulse chirp of such Raman pulses is linear because the they have a parabolic pulse profile without significant high-order dispersion in devices in FIGS. 1 and 2.

When a normally dispersive fiber amplifier has an ultrashort pulse as the input, a parabolic pulse evolves. Such parabolic pulse broadens both spectrally and temporally, as well as imprinting a linear chirp that is desirable for the subsequent pulse compression. When the pulse energy exceeds the SRS threshold in the fiber, the stimulated Raman scattering process occurs hampering further amplification of such parabolic pulse. The Raman scattering in fiber creates new frequency (wavelength) components called Stokes frequency (wavelength), which is 13.2 THz away from the center frequency of the parabolic pulse. Such Raman scattering may develop another parabolic pulse at the Stokes wavelength, if the Stokes wavelength has a positive gain from the doped media. This process is highly nonlinear process and the parabolic Raman pulse rapidly depletes the original parabolic pulse.

In mathematical terms, a set of nonlinear Schrödinger equations describes the behavior of the original parabolic pulse and the Stokes pulse on several assumptions, as follows:

$$\frac{\partial \psi_s}{\partial z} + \frac{i}{2}\beta_{2s}\frac{\partial^2 \psi_s}{\partial T^2} - \frac{\beta_{3s}}{6}\frac{\partial^3 \psi_s}{\partial T^3} = \qquad (1)$$
$$i\gamma_s[|\psi_s|^2 + (2-f_R)|\psi_r|^2]\psi_s - \frac{g_s}{2}|\psi_r|^2\psi_s + \frac{\alpha_s}{2}\psi_s,$$

$$\frac{\partial \psi_r}{\partial z} - d\frac{\partial \psi_r}{\partial T} + \frac{i}{2}\beta_{2r}\frac{\partial^2 \psi_r}{\partial T^2} - \frac{\beta_{3r}}{6}\frac{\partial^3 \psi_r}{\partial T^3} = \qquad (2)$$
$$i\gamma_r[|\psi_r|^2 + (2-f_R)|\psi_s|^2]\psi_r + \frac{g_r}{2}|\psi_s|^2\psi_r + \frac{\alpha_r}{2}\psi_r,$$

where $\psi_s$, $\psi_r$ represent the slowly varying envelopes of the signal and Raman pulses, $\beta_{ij}$ denotes the second- and the third-order dispersion (i=2,3 and j=s,r), $f_R$ denotes the fractional contribution of the delayed Raman response to the nonlinear polarization (~0.18), $\gamma_j$ are the nonlinear coefficients with the relation $\gamma_s=(\lambda_r/\lambda_s)\gamma_r$ where $\lambda_j$ is the wavelength, $g_j$ are the Raman gain coefficients with the relation $g_s=(\lambda_r/\lambda_s)g_r$, d denotes the walk-off parameter (d≈$\beta_{2s}\Omega_R$ with $\Omega_R=2\pi\times13.2$ THz), and $\alpha_j$ are the gain coefficients that depend on the wavelength. z is the propagation distance variable and T is a relative time variable which travels with the center of the signal pulse. Additional information related to Equations (1) and (2) can be found in M. Kuckartz, R. Schulz, and H. Harde, "Theoretical and experimental studies of the combined self-phase modulation and stimulated Raman-scattering in single-mode fibres," Opt. Quantum Electron. 19, 237-246 (1987). In Equations (1) and (2), the self-steepening and the delayed Raman scattering terms are ignored assuming the pulses of interest have long enough duration. In addition, the dispersion higher orders than the third-order dispersion are also ignored due to their small effects.

Under a first-order approximation, an analytical solution to Equs. (1) and (2) can be obtained based on the following conditions: (1) the third-order dispersion is ignored and (2) asymptotic parabolic solutions are adopted. The pulse behaviors can be classified into three different regimes, namely (1) the Gaussian Stokes pulse, (2) the asymmetric Stokes pulse, and (3) the large Stokes pulse. In the Gaussian Stokes pulse and asymmetric Stokes pulse regimes, the original parabolic pulse is not significantly depleted whereas a huge energy depletion and transfer to the Raman pulse happens in the large Stokes pulse regime. Additionally, when most of the energy is transferred from the original parabolic pulse to the Stokes pulse, the Stokes pulse itself evolves into a parabolic pulse. The fiber propagation distance $z_1$ where the Stokes pulse becomes a parabolic Raman pulse is calculated from the following:

$$\max\{|\psi_s(z_1)|^2\} = \frac{\alpha_r}{g_r}, \quad (3)$$

where $$|\psi_s(z_1)|^2 = \frac{d|\psi_s(z_0)|^2 L(T)}{H(z, T)}, \quad (4)$$

$$H(z,T) = g_s \int_0^T |\omega_s(z_0, u)|^2 L(u) du, \quad (5)$$

$$L(T) = \exp\left\{\frac{1}{d}\int_0^T [g_r|\psi_s(z_0, T')|^2 + g_s|\psi_r(z_0, T')|^2]\, dT'\right\}, \quad (6)$$

and $z_0$ is the propagation distance where the large Stokes pulse regime begins. $z_0$ can be obtained numerically as follows:

$$P_{r0} \exp\left(\alpha_r z_0 + \frac{3A_0^2 g_r}{2\alpha_s B^2}\left\{T_p^2(z_0) - T_0^2(z_0)\left[1 - \frac{4\alpha_s}{9d}T_0(z_0)\right]\right\}\right) = 2\frac{\alpha_s}{g_s}, \quad (7)$$

where $P_{r0} = h\nu_r \Delta\nu_{FWHM}\sqrt{\pi/(4I_0 g_R L_{eff})}$ with h is the Planck's constant, $\nu_r$ the Stokes frequency, $\Delta\nu_{FWHM}$ the gain bandwidth of the doped fiber (FWHM), $I_0$ the input pulse intensity, and $L_{eff} = [\exp(\alpha_s L) - 1]/\alpha_s$ with L, the doped fiber length. In addition, $A_0 = (\alpha_s U_{in}/\sqrt{\gamma_s \beta_2/2})^{1/3}2$ and $T_p(z) = B \exp(\alpha_s z/3)$ with $B = 6(A_0/\alpha_s)\sqrt{\gamma_s\beta_2/2}$. $T_0$ is the time position where the Stokes pulse has the maximum intensity, which moves as the light propagates down the fiber and is calculated as:

$$T_0(z) = -\frac{3d}{2\alpha_s} W\left(\frac{2\alpha_s}{3d} T_p(z)\right), \quad (8)$$

where W is the Lambert W-function described by R. M. Corless, G. H. Gonnet, D. E. G. Hare, D. J. Jefferey, and D. E. Knuth in "On the Lambert W function," Adv. Computational Maths 5, 329-359 (1996). Additional information on the Calculation of z1 can be found in D. B. S. Soh, J. Nilsson, and A. B. Grudinin, "Efficient femtosecond pulse generation using a parabolic amplifier combined with a pulse compressor. I. Stimulated Raman-scattering effects," J. Opt. Soc. Am. B 23, 1-9 (2006).

The $z_1$ calculation following equations from (3) to (8) can be used to determine where and in which condition the Stokes pulse becomes the parabolic Raman pulse for designed parameters of the fiber gain, the core size, and the input pulse energy. Once $z_1$ is obtained, the asymptotic solution of the parabolic Raman pulse can be calculated according to the following approximated equation:

$$\frac{\partial \psi_r}{\partial z} + i\beta_{2r}\frac{\partial^2 \psi_r}{\partial T^2} = i\gamma_r|\psi_r|^2\psi_r + \frac{\alpha_r}{2}\psi_r, \quad (9)$$

where it is assumed that the energy transfer from the original parabolic pulse to the Stokes pulse does not happen any more since most of the energy of the original parabolic pulse has been already transferred to the Stokes pulse. In order to create the parabolic Raman pulse, the amplifying fiber length is designed to be longer than $z_1$ until the amplifier triggers the second Stokes components. The doped-fiber length can be designed to be long up to the initial appearance of the second Stokes pulse to maximize the obtained energy of the parabolic Raman pulse from the amplifier.

Figure 3A:
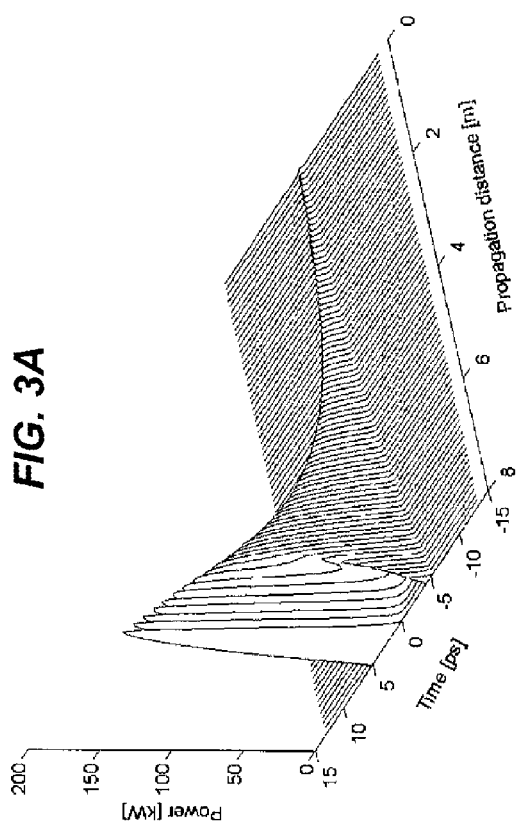
FIGS. 3A and 3B show the evolution of an input pulse that triggers a parabolic Raman pulse via nonlinear SRS process and the evolution of the parabolic Raman pulse.
Figure 3B:
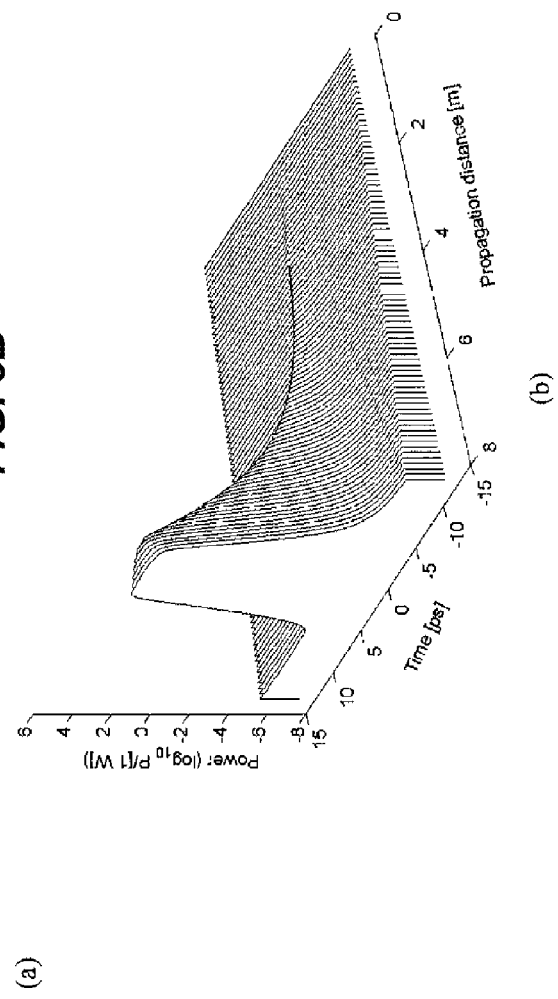

FIGS. 3A and 3B show simulation results of the spectral evolution of the parabolic Raman pulse. The simulation shows that a parabolic Raman pulse is created at the end of the amplifier (propagation distance>7 m). The z-axis of the original pulse in FIG. 3A is linear whereas that of the parabolic Raman pulse in FIG. 3B is log. Therefore, the rise of the parabolic Raman pulse happens within short propagation distance of 0.3 m. Once the parabolic Raman pulse is initialized by extracting energy from the original pulse, it develops into another parabolic pulse as shown in FIG. 3B.

Figure 4:
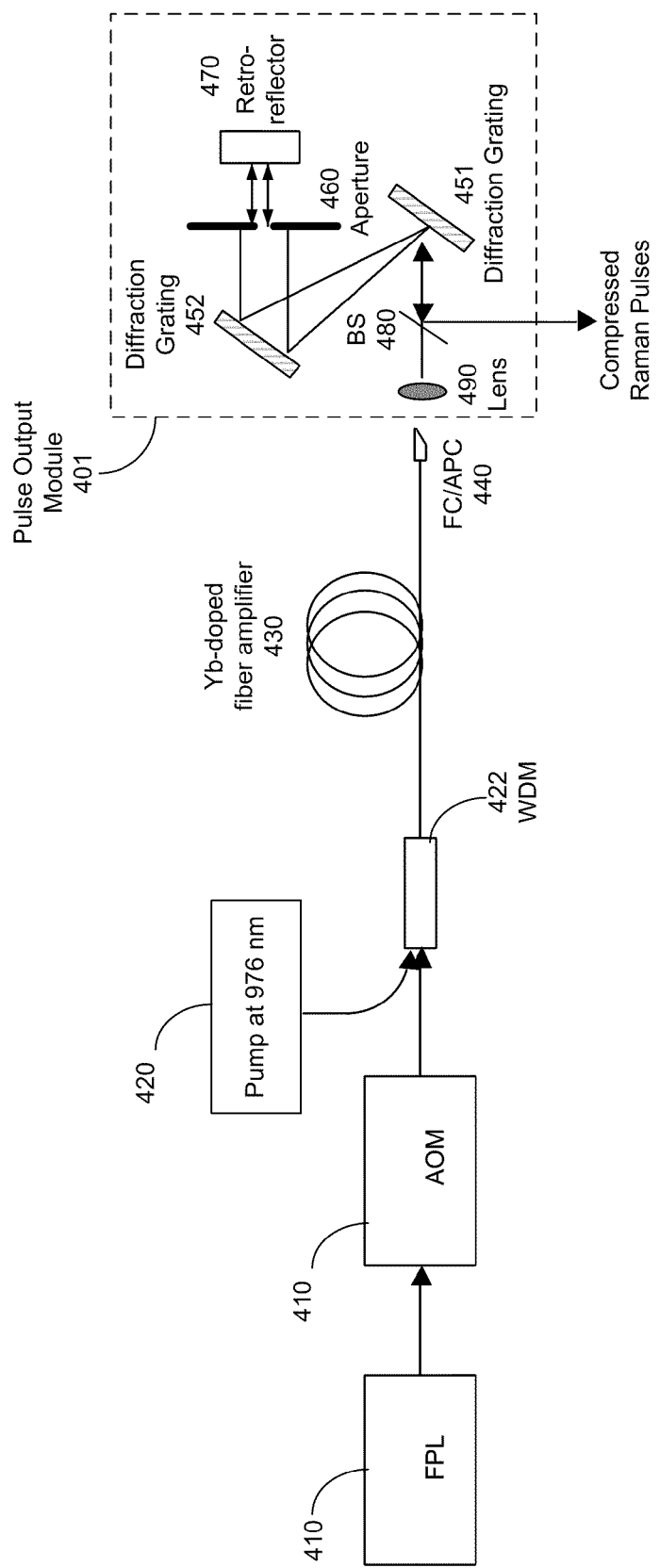
FIG. 4 shows an example of a pulse amplifier device based on SRS.

FIG. 4 shows an example of a pulse amplifier device that implements the design in FIG. 2. This device uses a polarization-maintaining femtosecond pulsed laser (FPL) 410 operating at 1030 nm (Calmar Optcom Inc., SESAM passively mode-locked fiber laser, FPL-U2). Since the optical fiber at 1 μm wavelength region is normally dispersive, a dispersion compensation scheme was adopted to ensure the net cavity dispersion to be anomalous. Then, a semiconductor saturable absorber was adopted triggering the self-starting of the passive mode-locking. In tests conducted using the device in FIG. 4, the FPL 410 was operated to produce an output power of 19 mW, with a repetition rate of 25 MHz, and an optical spectral bandwidth of 10.1 nm with a positively and linearly chirped 2.5 ps Gaussian pulse.

Figure 5:
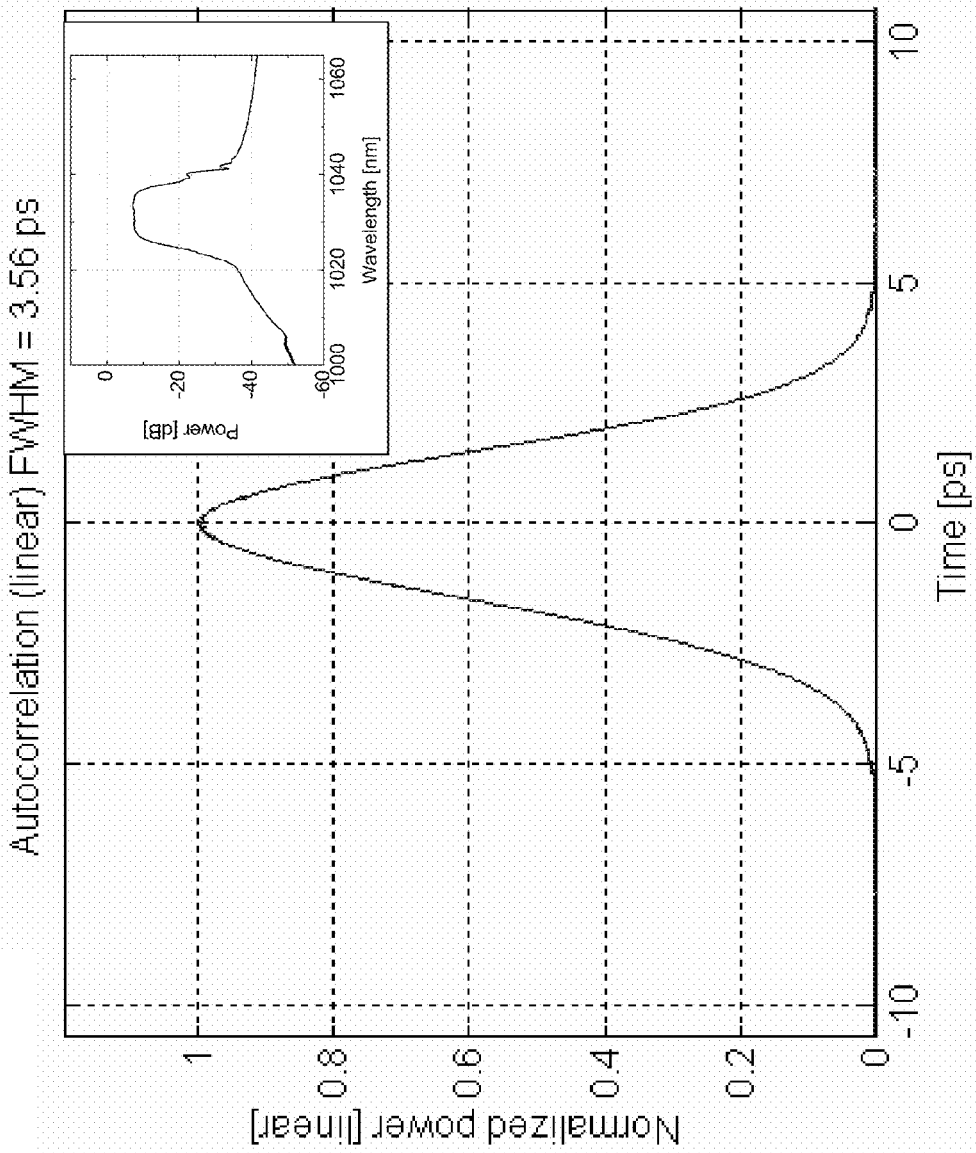
FIG. 5 shows autocorrelation trace of the seed fiber pulsed laser used in the device in FIG. 4 with respect to time and the optical spectrum of the laser.

FIG. 5 shows the optical spectrum and the autocorrelation trace of the FPL used in tests conducted with the device in FIG. 4.

A fiber-pigtailed acousto-optic modulator (AOM, Brimrose Inc.) 412 is used for down-sampling the fundamental 24.9 MHz repetition rate into a lower repetition rate. The AOM 410 had an extinction (on/off suppression) ratio of 43 dB and an insertion loss of 4 dB. A PCB control board is provided for the AOM 412 to vary the down-sampling repetition rate with dividing factor of 2's power, e.g., 2, 4, 8, 16, etc.

The fiber amplifier 430 is a core pumped Yb-doped fiber amplifier (INO, Yb100) with a length of 10 m. A wavelength-division multiplexer (WDM) 422 is coupled in the fiber amplifier 430 to couple pump light at 976 nm from a pump light source 420 into the amplifier 430 to co-propagate with the input pulse signal from the laser 410. The pump light source can use a wavelength-stabilized single-mode fiber pigtailed laser diode operating at 976 nm and producing output power up to 540 mW. In order to prevent the back reflection into the amplifier, the fiber is terminated at a selected fiber amplifier length with an FC/APC connector 440 that has an angled facet of, e.g., 11 degrees.

Downstream from the fiber amplifier 430, a pulse output module 401 is provided to compress the Raman pulses and to filter the spectral components of the Roman pulses. The pulse compressor as shown can be a Treacy-type diffraction grating-pair pulse compressor with two spaced diffraction gratings 451 and 452. The diffraction gratings 451 and 452 have 600 grooves/mm with a maximum first order efficiency of about 90%. A retro-reflector 470 is used to direct the light from the grating pair back to pass the compressor twice. An aperture 460 is placed between the grating pair and the retro reflector 470 to spatially block and filter out unwanted wavelength components separated by the grating pair. This aperture 460 in combination with the grating pair effectuates an optical spectral filter that transmits the light at the Raman frequency while rejecting light at other frequencies, including the light at the input laser frequency of 1030 nm, the light at the pump frequency of 976 nm and light at the second Stokes components of 1130 nm.

For the pulse compression, the 600 grooves/mm diffraction gratings with 90% of the first order diffraction efficiency had a total transmission efficiency of 64%. After the reflection from the first diffraction grating 451, three different wavelength components of 1030 nm (original parabolic pulse), 1080 nm (parabolic Raman pulse at first Stokes wavelength), 1130 nm (second Stokes wavelength) were separated. The position and size of the aperture 460 were adjusted to effectively select only the 1080 nm components for transmission while blocking other spectral components. The grating distance between the two gratings 451 and 452 and the input incident angle on the first diffraction grating 451 were adjusted to optimize the pulse compression operation.

In the device in FIG. 4, the entire device can be made to maintain a single-axis polarization, by adopting polarization-maintaining fibers including the doped fiber. All the components such as AOM 412 and WDM 422 are also polarization-maintaining components. The output from the pulse compressor based on the grating pair can be configured to have polarization extinction ratio of 21 dB with horizontally polarized axis.

The device in FIG. 4 was used to conduct measurements to evaluate the performance of the device. The laser 410 was operated to have a fundamental pulse repetition frequency of 25 MHz and the AOM 412 was used to down sampling the input pulses into lower pulse repetition frequencies at 12.5 MHz, 6.25 MHz, 3.125 MHz, 1.563 MHz, 781 kHz, 390 kHz, 195 kHz, and 98 kHz, respectively. For each fixed repetition rate, the pump power of the pump source 420 was adjusted in order to observe the stimulated Raman process for the different gains in the amplifier 430.

At the repetition rate at 6.25 MHz, the input optical power from the fiber laser 410 to the amplifier 430 was set at 1.89 mW, which was reduced from 19 mW of the FPL output due to the insertion loss of AOM 412 and the down-sampling operation. The optical pump power from the pump diode laser 420 at 976 nm was adjusted.

Figure 6:
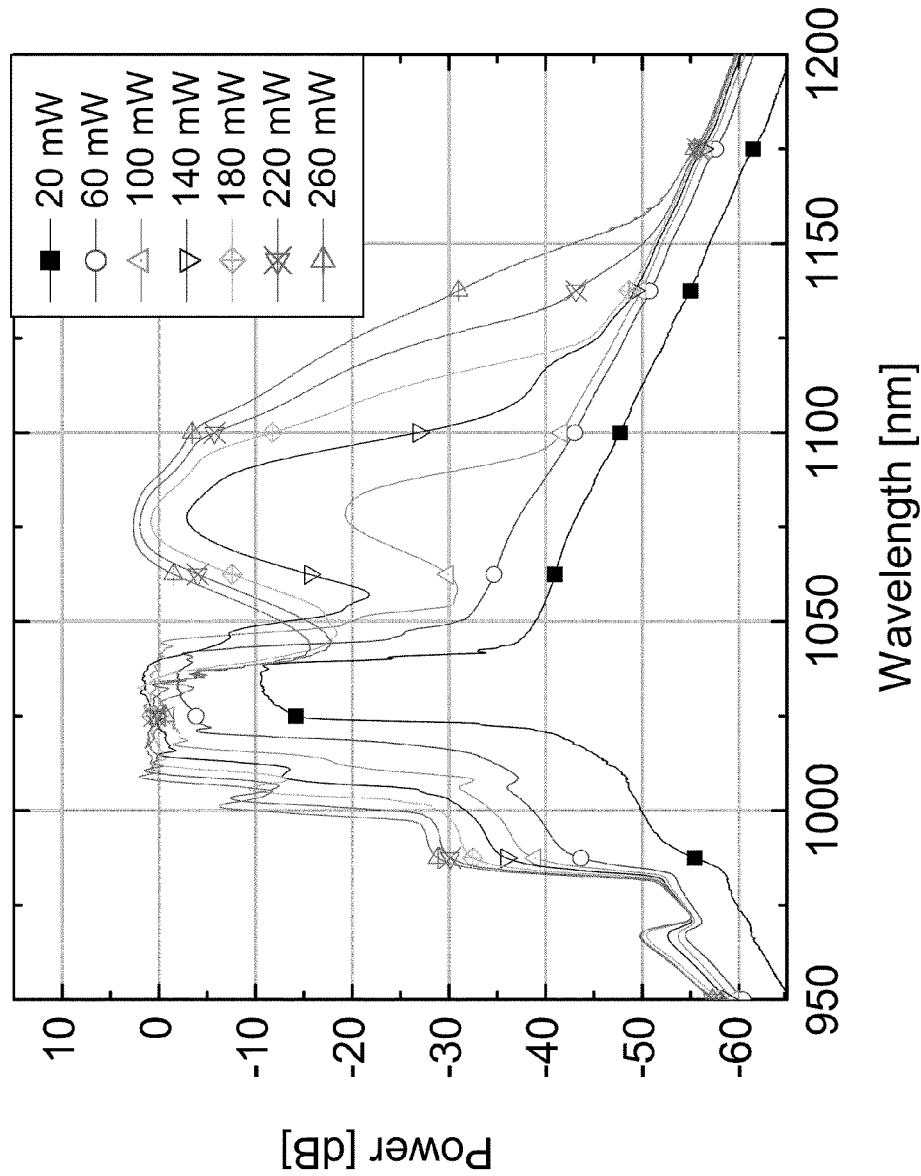
FIG. 6 shows optical spectra from the output of the fiber amplifier for various pump power levels in the device in FIG. 4, where the input signal has a pulsewidth of 3 ps, an optical power of 1.89 mW and a repetition rate of 6.25 MHz.

FIG. 6 shows the optical spectra for different pump powers. For the pump power less than 80 mW, the 1030 nm input optical pulse evolved into a parabolic pulse. The parabolic pulse stretched its spectral bandwidth as the energy increased. Once the pump power was over 80 mW, the Stokes pulse at 1080 nm began to appear. The newly generated Stokes pulse changed its regime of operation from Gaussian pulse shape (100 mW pump power), asymmetric pulse shape (100 mW, 140 mW). At 180 mW pump power, the Stokes pulse energy at 1080 nm was comparable with the original parabolic pulse at 1030 nm. At pump power over 180 mW, the original pulse energy began to be depleted. The asymmetric depletion process is shown in the optical spectrum of 260 mW curve at 1030 nm. Such asymmetric depletion is caused by the pulse walk-off between the original parabolic pulse at 1030 nm and Stokes pulse at 1080 nm. The stimulated Raman process happens at only the overlapping region between the 1030 nm and 1080 nm pulses, and once the pulses walk off from each other, the overlapping region changes. In our case, the longer wavelength components at 1030 nm region were more depleted than the shorter wavelength ones. Such energy depletion process happens quickly and with the pump power over 220 mW, the Stokes pulse at 1080 nm clearly began to form a parabolic pulse with a flat top spectral shape as evidenced by comparing the flatness of 1080 nm spectrum between the pump power of 260 mW and 100 mW.

Figure 7:
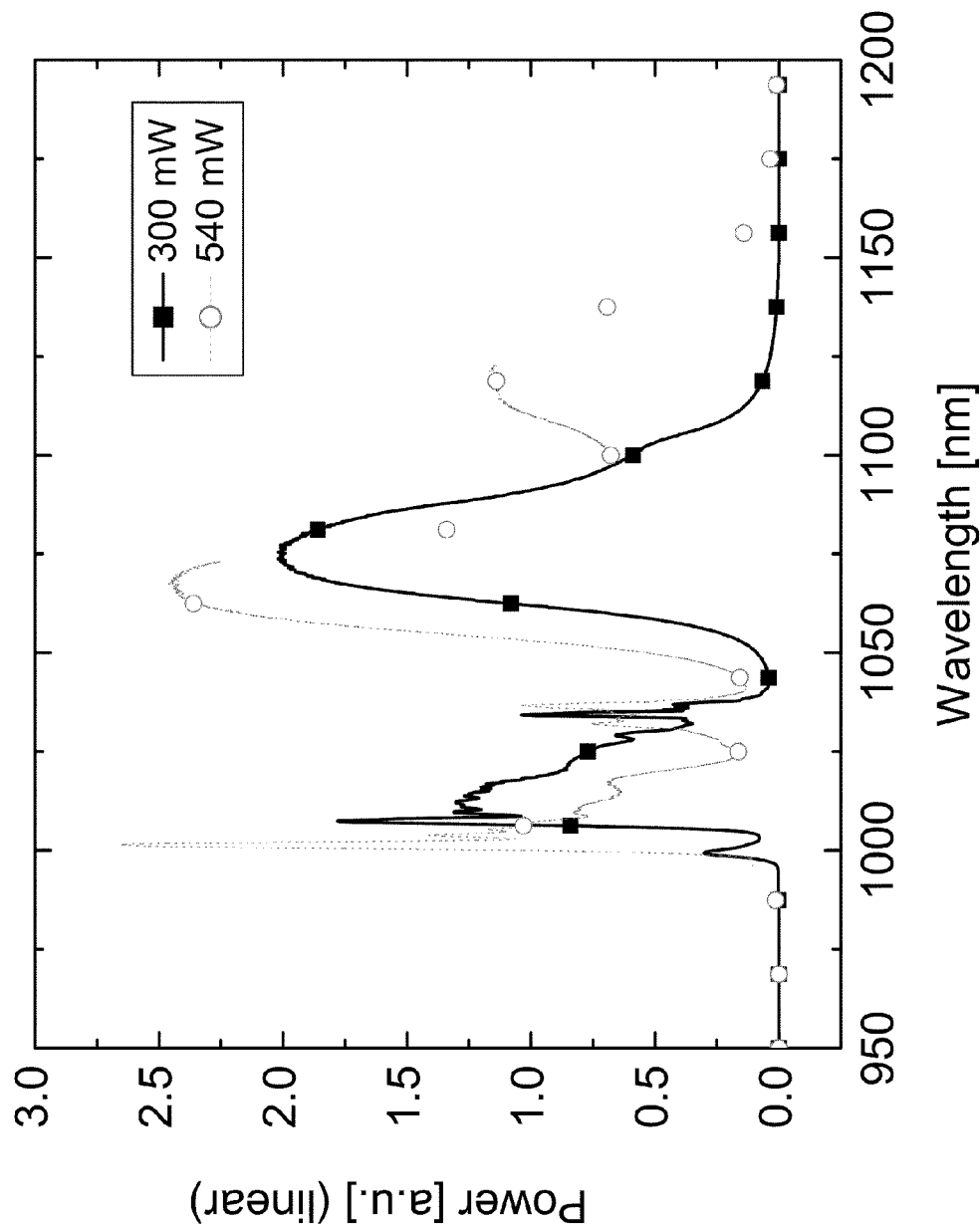
FIG. 7 shows measured optical spectra of the amplified optical output of the device in FIG. 4.

FIG. 7 shows a linear scale optical spectrum of the amplified output in the device in FIG. 4 when the pump power was set at 300 mW. The spectrum shows that the original pulse at 1030 nm was asymmetrically depleted due to the walk-off effect. As the pump power was increased further to the maximum of 540 mW, the second Stokes pulse at 1130 nm was generated. The original pulse is severely asymmetric due to stronger signal depletion in the walk-off situation. The presence of the second Stokes pulse suggests that the doped-fiber in the amplifier 430 was excessively long.

Figure 8:
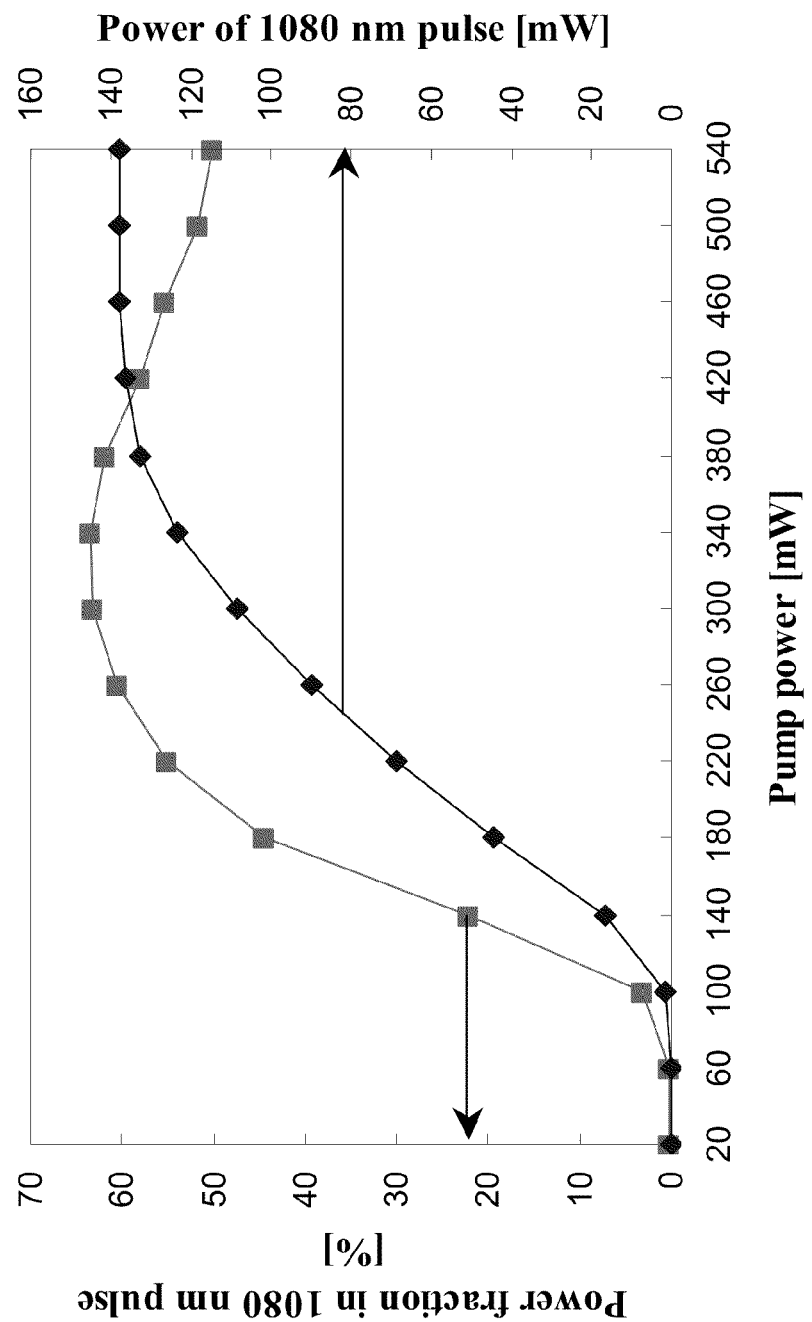
FIG. 8 shows calculated fractional power levels of the Stokes pulse at 1080 nm and the total power of the Stokes pulse for the device in FIG. 4.

FIG. 8 shows computation results of the power fraction of the first order Stokes pulse at 1080 nm for different pump power levels for a fiber amplifier length of 10 m. As seen from the optical spectra in FIG. 6, the Stokes pulse power remains negligible up to 60 mW pump power. Between the pump powers of 100 mW and 180 mW, the fraction of the 1080 nm Stokes pulse increases dramatically. This increase is due to the fact that the Raman scattering is a nonlinear process where the Raman gain is proportional to the square of the peak power of the original pulse. At pump power level above 180 mW, the increase of the Stokes pulse power is slowed down because the energy in 1030 nm is already significantly depleted and, hence, the contribution of the Raman gain is small. Instead, the power increase is due to the Yb-doped fiber amplifier gain at 1080 nm. This is also confirmed through the power increase curve in FIG. 8. The power increase rate in the pump range between 100 mW and 180 mW is nonlinear, suggesting Raman gain action and that between 180 mW and 300 mW pump power is rather linear, which suggests that the gain in this range is due to the saturated amplifier gain. Please note that when a fiber amplifier is saturated, the output power increase rate vs. the pump power is linear. Above the pump power of 300 mW, the 1080 nm power fraction reduces, due to the fact that now the second Stokes pulse at 1130 nm gains power through a Raman scattering process. Although the 1080 nm Stokes pulse power still increases in this range, the increase rate is significantly slowed down. Eventually at pump powers over 420 mW, the power at 1080 nm does not increase any more. The reason why the 1080 nm power does not decrease is due to the fact that still there is an amplification action at 1030 nm signal, which was not perfectly depleted and this remnant 1030 nm pulse still feeds the energy to the 1080 nm Stokes pulse. Therefore, instead of reducing the power, 1080 nm Stokes pulse keeps the energy when the pump power increases over 420 mW. In order to optimize the 1080 nm parabolic Stokes pulse power, the Yb-doped fiber was cut to about 8 m during tests until the 1130 nm signal for the second Stokes signal disappeared. At 8 m of fiber length, no signal at 1130 nm (second Stokes signal) was observed at a pump power of 540 mW and the power of parabolic Raman pulse at 1080 nm was measured to be about 230 mW.

Figure 9:
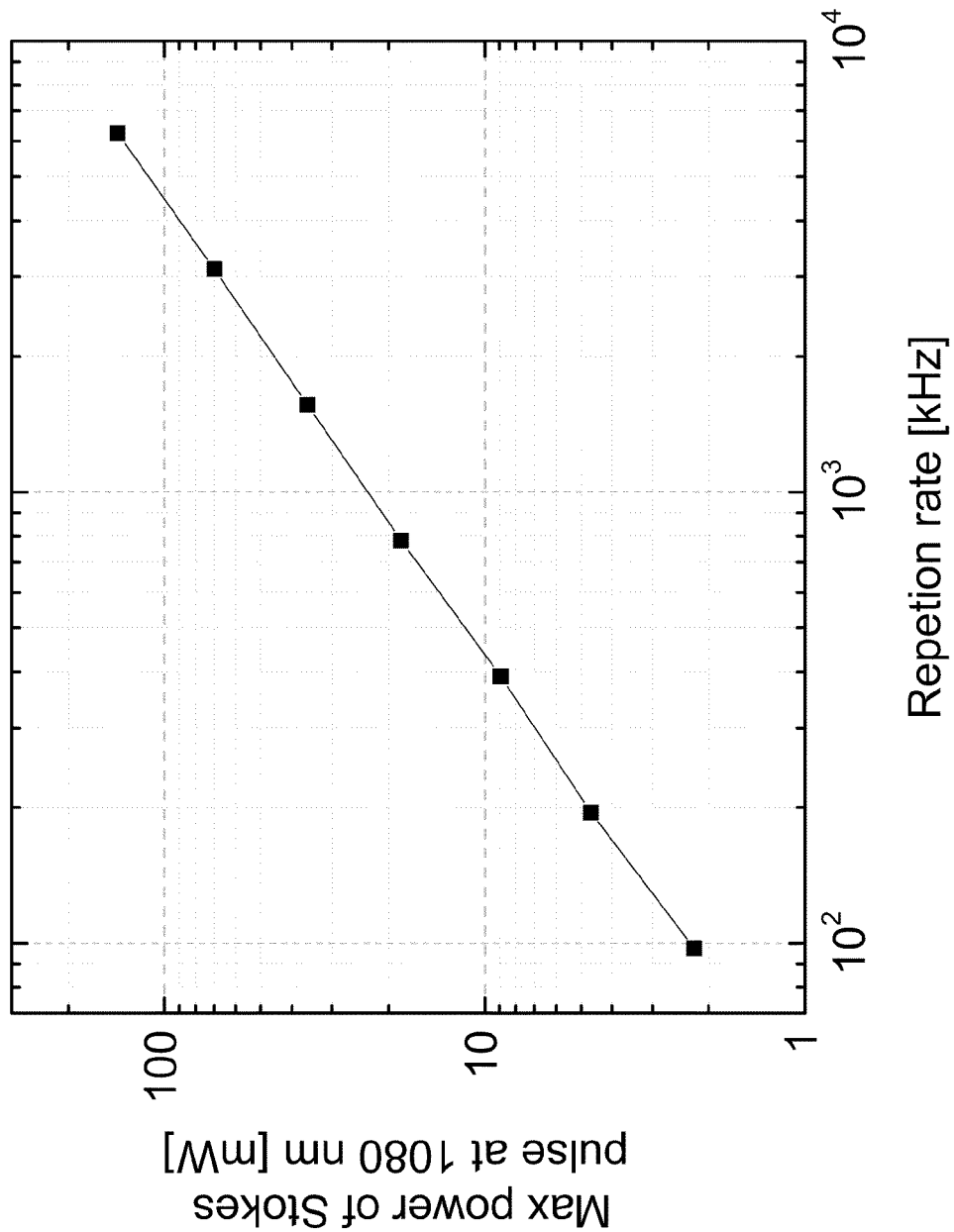
FIG. 9 shows the measured maximum output power of the parabolic Raman pulse at 1080 nm for various repetition rates in testing the device in FIG. 4.

Measurements for the device in FIG. 4 were also conducted for the repetition rates ranging from 6.25 MHz to 90 kHz. FIG. 9 shows the measured maximum output power of the parabolic Raman pulse at 1080 nm for various repetition rates. The measurements indicate that the repetition rate and the maximum power obtainable at 1080 nm forms a linear relationship with each other and this linear relationship shows that the maximum energy obtainable at the first Stokes wavelength does not depend on the operating repetition rate. The maximum obtainable energy in the measurements was 23 nJ at different repetition rates.

Figure 10:
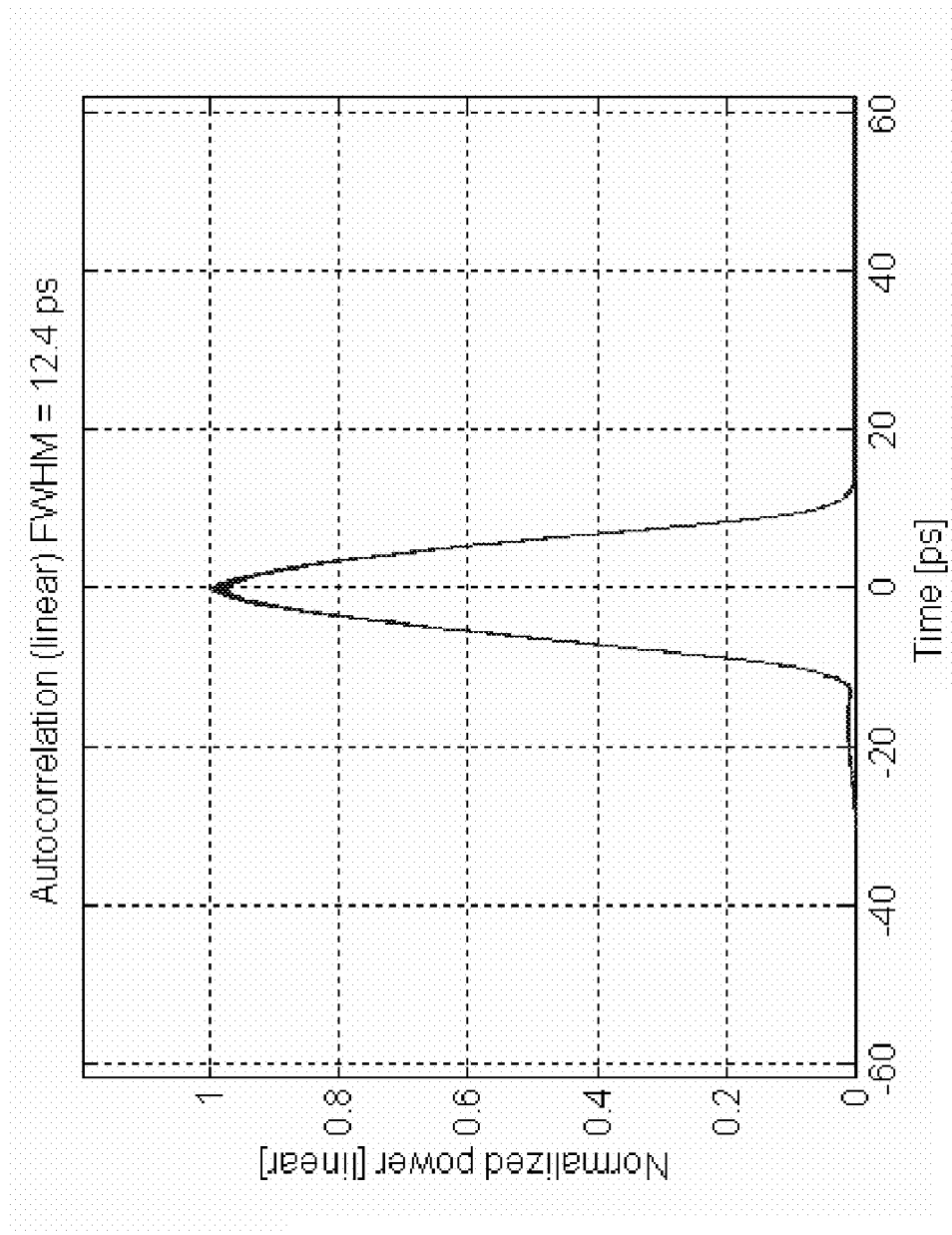
FIG. 10 shows the measured autocorrelation trace of the parabolic Raman pulse before compressing in the device in FIG. 4.

FIG. 10 shows measured autocorrelation trace of the measured parabolic Raman pulse before compressing in the device in FIG. 4. The input pulse repetition rate was reduced by the AOM 412 to 6.25 MHz, the pump power was set to 300 mW and the Yb-doped fiber length was 10 m. A conversion factor of 0.872 from the autocorrelation trace to the real FWHM pulsewidth was applied in the trace in FIG. 10 for a parabolic pulse. The pulsewidth was found to be 10.8 ps (FWHM) at the amplified output (before pulse compressor). As shown in the autocorrelation trace, the pulse clearly formed a parabolic shape, which is different from typical Gaussian pulses.

Figure 11B:
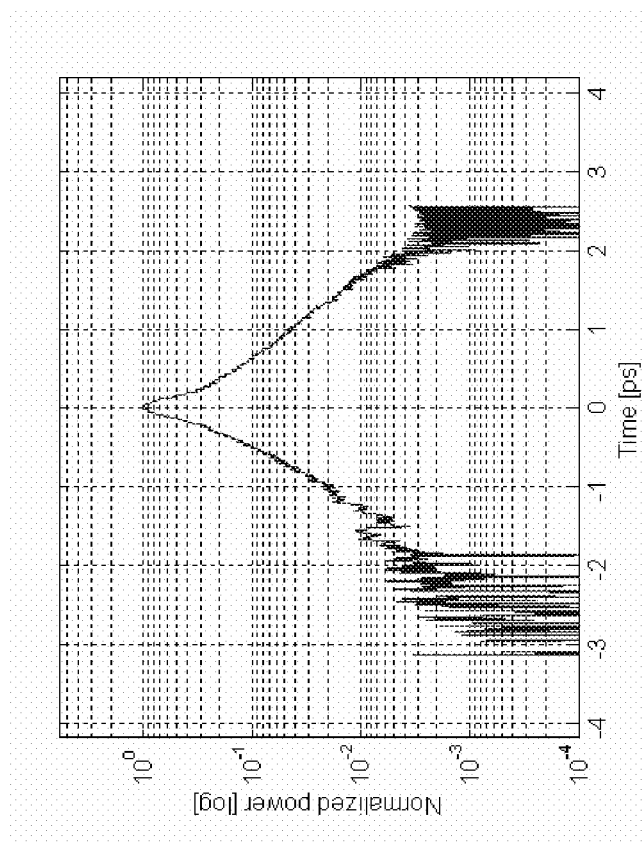
FIGS. 11A and 11B show the autocorrelation traces of the optimized compressed pulse in both linear and log scales when the repetition rate and the pump power were 6.25 MHz and 300 mW, respectively.
Figure 11A:
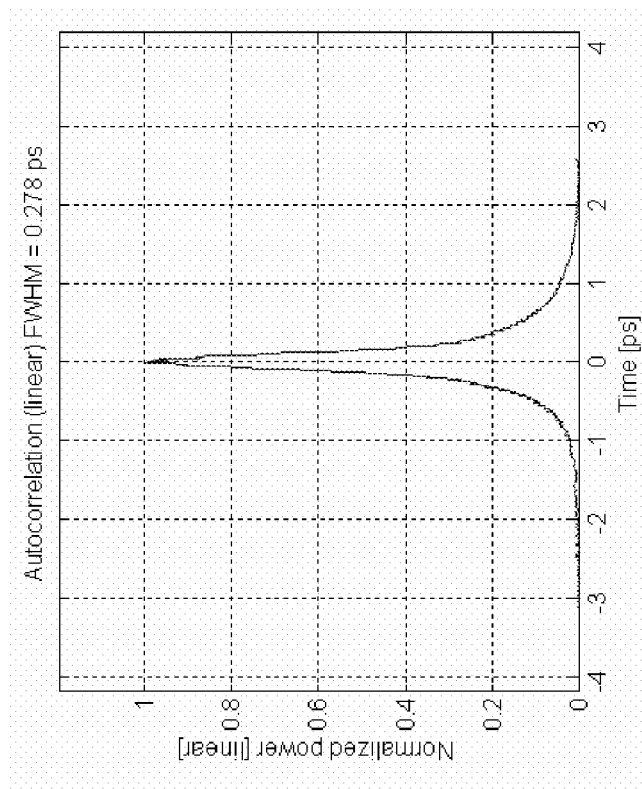

FIGS. 11A and 11B show the autocorrelation traces of the optimized compressed pulse in both linear and log scales when the repetition rate and the pump power were 6.25 MHz and 300 mW, respectively. The shortest pulse was obtained when the grating separation distance was 12 cm and the beam incident angle to the first diffraction grating was 40 degree. The compressed pulse had two times transform-limited pulsewidth. The pulse tails are more visible in the log scale and were caused by the uncompensated third-order dispersion.

From the obtained data, the third-order dispersion of the parabolic Raman pulse before the pulse compression can be obtained. The dispersion from the grating-pair compressor was calculated to have $\beta_2^{tot} = -0.17423$ $ps^2$ and $\beta_3^{tot} 0.00029873$ $ps^3$. Since the optical bandwidth of the parabolic Raman pulse was 17 nm, the transform limited pulsewidth should be 90 fs. Assuming the second-order dispersion is compensated whereas there remains a nonzero value of the third-order dispersion, the compressed pulsewidth can be computed:

$$\frac{\sigma}{\sigma_0} = \sqrt{1 + \frac{1}{2}\left(\frac{\beta_3^{tot,rem}}{4\sigma_0^3}\right)^2}, \quad (10)$$

where $\sigma$, $\sigma_0$ are the rms pulsewidth (FWHM) of the non-ideally compressed pulse (i.e. nonzero third-order dispersion) and of the ideally compressed pulse (i.e. perfect compensation and, hence, zero second- and third-order dispersion). The third-order dispersion of the generated parabolic Raman pulse can be estimated as $\beta_3^{tot,Raman} = 0.000247$ $ps^3$. This value suggests that the third-order dispersion in the generated parabolic Raman pulse is not so serious and the pulse itself is almost linearly chirped. We also compressed the parabolic Raman pulses at various repetition rate and obtained nearly similar results for the optimized shortest pulse, which varied from 175 fs to 185 fs with a weak relation to the repetition rate. This variation is well within the measurement error bound of the used aurocorrelator (Femtochrome Inc., FR-103XL).

The above measurements of the device in FIG. 4 demonstrate that the SRS process can be used to generate wavelength-shifted Raman pulses to increase the output energy of the ultrashort pulse amplification through rare-earth doped optical fibers. The measurements were performed by using parabolic input pulses to create Stokes pulses also in a parabolic shape. The newly created Stokes pulses rapidly broadened its spectral and temporal shape, extracting more energy from the amplifier than other pulse amplification techniques. Other pulse profiles different from the parabolic pulses may also be used in implementing the disclosed SRS-based wavelength-shifted Raman pulses. For example, cubicon pulses as described by Shah, et al. in "High energy femtosecond Yb cubicon fiberamplifier," Opt. Express 13, 4717-4722 (2005), may also be used. The cubicon pulse amplification is known to overcome the third-order dispersion ($\beta_3$) in the compressor. By rendering the optical spectrum asymmetric, the self-phase modulation in the amplifier fiber produces a higher (third) order chirp. The generated chirp can neutralize the net $\beta_3$ after the pulse compressor, generating high quality compressed pulse with low pedestals. Since the parabolic Raman pulse has intrinsically smaller third order dispersion and the cubicon pulse usually provides a limited third order chirp, it is easy to combine these two techniques to design a high energy amplifier system.

Figure 12:
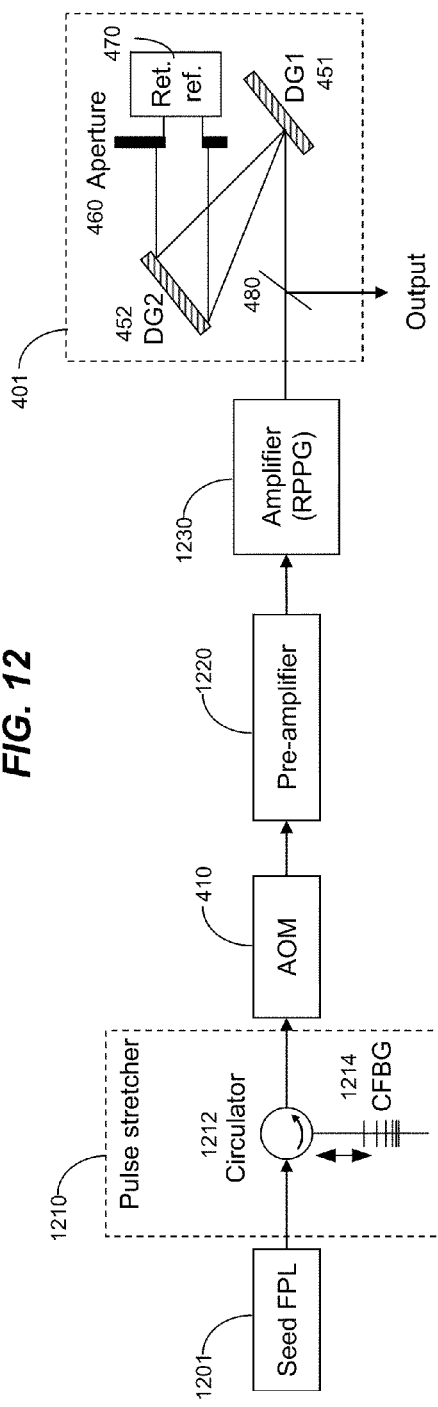
FIGS. 12 and 13 show two additional examples of pulse amplifier devices based on SRS.

Various device implementations of the device designs in FIGS. 1 and 2 can be made. FIG. 12 shows another example of a pulse amplifier device based on SRS described above. In this device, a seed fiber pulse laser (FPL) 1201 is used to produce optical pulses. A pulse stretcher 1210 is provided to extend the pulse duration of each pulse. In this example, the pulse stretcher 1210 implements a 3-port optical circulator 1212 for routing the light and a chirped fiber Bragg grating 1214 for stretching each pulse. The light from the laser 1201 is directed by the circulator 1212 to the fiber grating 1214 which reflects the light back to the circulator 1212 after stretching each pulse. The reflected light from the grating 1214 is directed to the rest of the amplifier device. The amplifier device provides two amplification stages: a pre-amplifier 1220 that amplifies the stretched pulses and a Raman amplifier 1230 that further amplifies the amplified pulses from the pre-amplifier 1220 to generate the wavelength-shifted Raman pulses which are then compressed and filtered by the module 401. The Raman amplifier 1230 can use either a cladding or a core pumped fiber amplifier.

Figure 13:
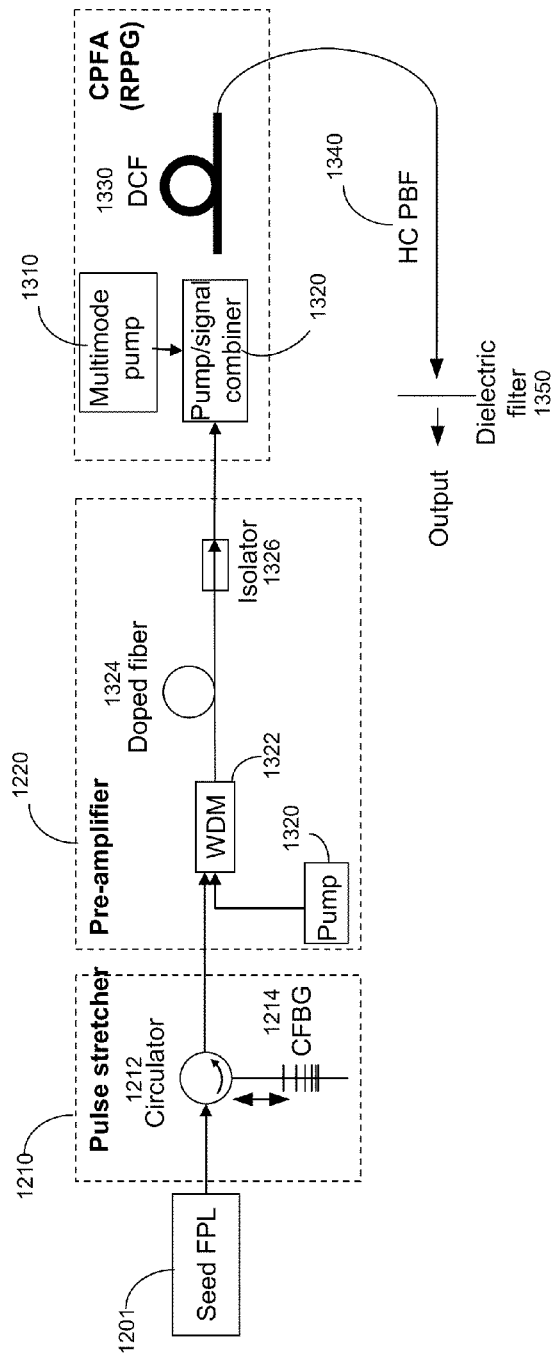

FIG. 13 shows a different pulse amplifier device based on SRS using two-stage amplification. The pre-amplifier 1220 includes a pump source 1320, a WDM coupler 1322, a doped fiber 1324 and an optical isolator 1326. The Raman amplifier includes a multimode pump light source 1310 that produces a multimode pump beam to pump a double-clad doped fiber (DCF) gain section 1330. A pump and signal combiner 1320 is used to couple the multimode pump beam into the fiber while transmitting the amplified optical pulses output by the pre-amplifier 1220. A pulse compressor 1340 is implemented by using a hollow core photonic bandgap fiber (HC PBF). A dielectric optical filter 1350 is used to filter the output light from the compressor 1340 to transmit the Raman pulses and to reject light at other frequencies.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. For example, the described dispersion compensation designs for the laser and the amplifier may be separated implemented as shown in FIGS. 3 and 4, respectively, without being in the combination shown in FIG. 2.

Only a few examples and implementations are described. Other implementations, variations, modifications and enhancements to the described examples and implementations may be made.

What is claimed is:

1. A method for using stimulated Raman scattering to produce amplified laser pulses in an optical amplifier device, comprising:
    directing a train of input laser pulses at a first pulse repetition rate and at an input laser frequency into an optical amplifier that has an optical gain section to amplify the input laser pulses;
    controlling the input laser pulses to extend a pulse duration of each laser pulse;
    setting pump light at a pump wavelength different from the input laser frequency coupled into the optical gain section at a power level to optically excite the optical gain section to produce an optical gain at the input laser frequency to amplify optical power of each input laser pulse at the input laser frequency above a stimulated Raman scattering threshold of the optical gain section to generate Raman pulses that are at a Raman optical frequency shifted from the input laser frequency by a Raman frequency detuning and are amplified in power by the optical gain section; and
    coupling the Raman pulses out of the optical gain section as amplified laser pulses after a length of propagation in the optical gain section before or at beginning of generation of secondary Raman pulses from the Raman pulses at an optical frequency shifted from the Raman optical frequency of the Raman pulses by the Raman frequency detuning.

2. The method as in claim 1, comprising:
controlling the input laser pulses to have a cubicon pulse shape.

3. The method as in claim 1, comprising:
controlling the input laser pulses to have a parabolic power profile with respect to time.

4. The method as in claim 1, comprising:
before the input laser pulses at the first pulse repetition rate reach the optical gain section, converting the input laser pulses into laser pulses at a second pulse repetition rate less than the first pulse repetition rate.

5. The method as in claim 4, comprising:
using an acousto-optic modulator to convert the input laser pulses at the first pulse repetition rate into the laser pulses at the second pulse repetition rate.

6. The method as in claim 4, comprising:
setting a power level of the pump light based on the second pulse repetition rate.

7. The method as in claim 6, comprising:
setting the pump light at different power levels for different second pulse repetition rates.

8. The method as in claim 1, comprising:
filtering output light from the optical gain section to transmit the Raman pulses light at the Raman optical frequency while rejecting light at other frequencies.

9. The method as in claim 1, comprising:
compressing a temporal duration of the Raman pulses that are coupled out of the optical gain section.

10. The method as in claim 9, comprising:
using two diffraction gratings placed in series in an optical path of the Raman pulses coupled out of the optical gain section to compress the Raman pulses.

11. The method as in claim 10, comprising:
using a retro-reflector to direct the Raman pulses to pass through the two diffraction gratings twice to compress the Raman pulses.

12. The method as in claim 10, comprising:
spatially filtering different spectral components of the Raman pulses that pass through the two diffraction gratings to transmit light at the Raman optical frequency downshifted by the Raman frequency detuning from the input laser frequency while blocking light at other frequencies.

13. The method as in claim 9, comprising:
using a prism pair to compress the Raman pulses.

14. The method as in claim 9, comprising:
using a prism pair to compress the Raman pulses.

15. The method as in claim 9, comprising:
using a photonic crystal fiber to compress the Raman pulses.

16. The method as in claim 9, comprising:
using a volume Bragg grating to compress the Raman pulses.

17. The method as in claim 1, comprising:
using parabolic laser pulses as the input laser pulses; and
compressing a temporal duration of the Raman pulses that are coupled out of the optical gain section.

18. A method for using stimulated Raman scattering to produce amplified laser pulses in an optical amplifier device, comprising:
    directing a train of input laser pulses at a first pulse repetition rate and at an input laser frequency into an optical amplifier that has an optical gain section to amplify the input laser pulses;
    setting pump light at a pump wavelength different from the input laser frequency coupled into the optical gain section at a power level to optically excite the optical gain section to produce an optical gain at the input laser frequency to amplify optical power of each input laser pulse at the input laser frequency above a stimulated Raman scattering threshold of the optical gain section to generate Raman pulses that are at a Raman optical frequency shifted from the input laser frequency by a Raman frequency detuning and are amplified in power by the optical gain section; and
    coupling the Raman pulses out of the optical gain section as amplified laser pulses after a length of propagation in the optical gain section before or at beginning of generation of secondary Raman pulses from the Raman pulses at an optical frequency shifted from the Raman optical frequency of the Raman pulses by the Raman frequency detuning,
wherein:
the input laser pulses are positively and linearly chirped laser pulses.

19. The method as in claim 1, wherein:
the optical gain section is a fiber gain section.

20. The method as in claim 1, comprising:
controlling the input laser pulses to be linearly polarized pulses; and
maintaining polarization of each laser pulse in generating the Raman pulses.

21. The method as in claim 18, comprising:
before the input laser pulses at the first pulse repetition rate reach the optical gain section, converting the input laser pulses into laser pulses at a second pulse repetition rate less than the first pulse repetition rate.

22. The method as in claim 21, comprising:
using an acousto-optic modulator to convert the input laser pulses at the first pulse repetition rate into the laser pulses at the second pulse repetition rate.

23. The method as in claim 21, comprising:
setting a power level of the pump light based on the second pulse repetition rate.

24. The method as in claim 23, comprising:
setting the pump light at different power levels for different second pulse repetition rates.

25. The method as in claim 18, comprising:
filtering output light from the optical gain section to transmit the Raman pulses light at the Raman optical frequency while rejecting light at other frequencies.

26. The method as in claim 18, comprising:
compressing a temporal duration of the Raman pulses that are coupled out of the optical gain section.

27. The method as in claim 26, comprising:
using two diffraction gratings placed in series in an optical path of the Raman pulses coupled out of the optical gain section to compress the Raman pulses.

28. The method as in claim 27, comprising:
using a retro-reflector to direct the Raman pulses to pass through the two diffraction gratings twice to compress the Raman pulses.

29. The method as in claim 27, comprising:
spatially filtering different spectral components of the Raman pulses that pass through the two diffraction gratings to transmit light at the Raman optical frequency downshifted by the Raman frequency detuning from the input laser frequency while blocking light at other frequencies.

30. The method as in claim 26, comprising:
using a prism pair to compress the Raman pulses.

31. The method as in claim 26, comprising:
using a prism pair to compress the Raman pulses.

32. The method as in claim 26, comprising:
using a photonic crystal fiber to compress the Raman pulses.

33. The method as in claim 26, comprising:
using a volume Bragg grating to compress the Raman pulses.

34. The method as in claim 18, comprising:
using parabolic laser pulses as the input laser pulses; and
compressing a temporal duration of the Raman pulses that are coupled out of the optical gain section.

35. The method as in claim 18, wherein:
the optical gain section is a fiber gain section.

36. The method as in claim 18, comprising:
controlling the input laser pulses to be linearly polarized pulses; and
maintaining polarization of each laser pulse in generating the Raman pulses.

* * * * *

UNITED STATES PATENT AND TRADEMARK OFFICE
CERTIFICATE OF CORRECTION

PATENT NO. : 7,991,022 B1
APPLICATION NO. : 12/352843
DATED : August 2, 2011
INVENTOR(S) : Daniel Beom Soo Soh and Anthony Hong Lin It is certified that error appears in the above-identified patent and that said Letters Patent is hereby corrected as shown below:

In Column 6, Line 14, please delete "Xr" and insert -- $\lambda r$ --, therefor.

In Column 9, Lines 27-28, in Equation (4), please delete " $|\psi_s(z_1)|^2$ " and insert -- $|\psi_s(z)|^2$ --, therefor.

In Column 9, Line 32, in Equation (5), please delete " $H(z,T) = g_r \int_0^T |\omega_s(z_0,u)|^2 L(u)du$ " and insert -- $H(z,T) = g_r \int_0^T |\psi_s(z_0,u)|^2 L(u)du$ ,--, therefor.

In Column 9, Line 52, please delete " $A_0 = (\alpha_s U_{in}/\sqrt{\gamma_s \beta_2/2})^{1/3} 2$ " and insert -- $A_0 = (\alpha_s U_{in}/\sqrt{\gamma_s \beta_{2s}/2})^{1/3} /2$ --, therefor.

In Column 14, Line 2, please delete "aurocorrelator" and insert -- autocorrelator --, therefor.

Signed and Sealed this
Tenth Day of January, 2012

David J. Kappos
*Director of the United States Patent and Trademark Office*